United States Patent
Liu

(10) Patent No.: US 11,863,480 B2
(45) Date of Patent: Jan. 2, 2024

(54) METHOD AND DEVICE FOR TRANSMITTING REFERENCE SIGNAL

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 454 days.

(21) Appl. No.: 17/269,564

(22) PCT Filed: Aug. 28, 2018

(86) PCT No.: PCT/CN2018/102756
§ 371 (c)(1),
(2) Date: Feb. 19, 2021

(87) PCT Pub. No.: WO2020/041979
PCT Pub. Date: Mar. 5, 2020

(65) Prior Publication Data
US 2021/0328740 A1    Oct. 21, 2021

(51) Int. Cl.
*H04L 5/00*    (2006.01)
(52) U.S. Cl.
CPC ..................... *H04L 5/0048* (2013.01)
(58) Field of Classification Search
None
See application file for complete search history.

(56) References Cited

U.S. PATENT DOCUMENTS

| | | |
|---|---|---|
| 2017/0094657 A1 | 3/2017 | Yoon |
| 2018/0241508 A1 | 8/2018 | Chervyakov et al. |
| 2018/0302202 A1 | 10/2018 | Kim et al. |
| 2018/0352549 A1 | 12/2018 | Yoon |
| 2019/0069282 A1* | 2/2019 | Luo ........................ H04L 5/0094 |
| 2019/0222381 A1* | 7/2019 | Zhang ............... H04L 27/26025 |
| 2019/0222985 A1* | 7/2019 | Nguyen .................. H04W 4/44 |
| 2020/0079425 A1* | 3/2020 | Eilers .................. B62D 15/0245 |

FOREIGN PATENT DOCUMENTS

| | | |
|---|---|---|
| CN | 103079217 A | 5/2013 |
| CN | 105513378 A | 4/2016 |
| CN | 106797297 A | 5/2017 |
| CN | 107979452 A | 5/2018 |
| CN | 108141340 A | 6/2018 |

(Continued)

OTHER PUBLICATIONS

International Search Report in the international application No. PCT/CN2018/102756, dated May 29, 2019, 2 pgs.

(Continued)

*Primary Examiner* — Saba Tsegaye
(74) *Attorney, Agent, or Firm* — Cooper Legal Group, LLC

(57) ABSTRACT

The present invention relates to a method and device for transmitting a reference signal. The method comprises: acquiring a current traveling speed; determining a corresponding reference signal transmission density according to a speed level to which the current traveling speed belongs; and transmitting a reference signal to a connected opposite end vehicle-mounted terminal according to the reference signal transmission density.

14 Claims, 6 Drawing Sheets

(56) References Cited

FOREIGN PATENT DOCUMENTS

WO 2009119051 A1 10/2009
WO 2017052489 A1 3/2017

OTHER PUBLICATIONS

English translation of the Written Opinion of the International Search Authority in the international application No. PCT/CN2018/102756, dated May 29, 2019, 4 pgs.
"Discussion on DMRS Enhancement for PC5-based V2V"; Feb. 2016; 3GPP TSG RAN WG1 Meeting #84, R1-160497, CMCC, 3 pgs.
"Evaluations of DMRS Enhancement for PC5-based V2V"; Nov. 2015; 3GPP TSG RAN WG1 Meeting #83, R1-157314, NTT Docomo, 5 pgs.

* cited by examiner

METHOD AND DEVICE FOR TRANSMITTING REFERENCE SIGNAL

TECHNICAL FIELD

The present disclosure relates to the field of communication technology, and more particularly, to a method and device for transmitting a reference signal.

BACKGROUND

In a related art, with development of Internet technology, Internet of Vehicles has become a hot research topic. A focus of long-term research is reliable communication between vehicles in the Internet of Vehicles. Communication technology of the Internet of Vehicles may learn from communication technology of a mobile communication system. In the mobile communication system, user equipment sends a reference signal to a base station for channel estimation and so on. However, for the Internet of Vehicles, since a vehicle moves at a great speed, a reference signal transmission method in the mobile communication system may not meet a demand.

SUMMARY

Embodiments of the present disclosure provide a method and device for transmitting a reference signal. The technical solution is as follows.

According to a first aspect of embodiments of the present disclosure, there is provided a method for transmitting a reference signal, which includes: acquiring a current driving speed; determining a corresponding reference signal transmission density according to a speed level to which the current driving speed belongs; and sending a reference signal to a connected vehicle terminal at an opposite end according to the reference signal transmission density.

The technical solution provided by embodiments of the present disclosure may include the following beneficial effects: in the embodiments, the corresponding reference signal transmission density may be selected according to the driving speed of the vehicle terminal, so as to improve the possibility of successful reception by the vehicle terminal at the opposite end, which helps subsequent communication between the two vehicle terminals.

In an embodiment, the operation that the reference signal is sent to the connected vehicle terminal at the opposite end may include: the reference signal is sent to the connected vehicle terminal at the opposite end through a control channel in a unicast mode.

The technical solution provided by the embodiment of the present disclosure may include the following beneficial effects: the embodiment provides an implementation mode for transmitting the reference signal for an Internet of Vehicles, that is, transmission through the control channel in the unicast mode.

In an embodiment, the method may further include: level identification information of the speed level is sent to the connected vehicle terminal at the opposite end.

The technical solution provided by the embodiment of the present disclosure may include the following beneficial effects: the embodiment may further send level identification information to the vehicle terminal at the opposite end, so that the vehicle terminal at the opposite end knows the reference signal transmission density and may better receive the reference signal.

In an embodiment, the method may further include: relevant driving information of the opposite end sent by a vehicle terminal at the opposite end is received.

The operation of determining the corresponding reference signal transmission density according to the speed level to which the current driving speed belongs may include: the speed level is determined according to the current driving speed and the relevant driving information of the opposite end; and the corresponding reference signal transmission density is determined according to the determined speed level.

The technical solution provided by the embodiment of the present disclosure may include the following beneficial effects: in the embodiment, the relevant driving information may be transmitted among the vehicle terminals, the speed level is determined according to the current driving speed together with the relevant driving information, to improve the accuracy of the determined speed level. Then a more appropriate reference signal transmission density is selected.

In an embodiment, the relevant driving information of the opposite end may include at least one of: a driving speed of the opposite end, a driving direction of the opposite end, or a relative driving speed.

The technical solution provided by the embodiment of the present disclosure may include the following beneficial effects: the embodiment may refer to various kinds of relevant driving information of the opposite end, and is applicable to various application scenarios.

In an embodiment, the method may further include: feedback information sent by a vehicle terminal at the opposite end is received; and in response to the feedback information meeting a preset increase condition, the speed level to which the current driving speed belongs is increased.

The technical solution provided by the embodiment of the present disclosure may include the following beneficial effects: in the embodiment, the speed level may further be adjusted according to the feedback information sent by the vehicle terminal at the opposite end, improving the accuracy of the determined speed level. Then, a more appropriate reference signal transmission density is selected.

In an embodiment, the feedback information may include at least one of: link measurement information or a feedback signal for the reference signal.

The increase condition may include at least one of: the feedback signal indicating reception failure; the feedback signal indicating reception failure, and a number of consecutive failures reaching a preset failure number threshold; or link quality indicated by the link measurement information being lower than a preset quality threshold.

The technical solution provided by the embodiment of the present disclosure may include the following beneficial effects: the embodiment provides multiple types of feedback information and corresponding increase conditions, and is applicable to multiple application scenarios.

According to a second aspect of embodiments of the present disclosure, there is provided a device for transmitting a reference signal, which includes: an acquiring module, configured to acquire a current driving speed; a density determining module, configured to determine a corresponding reference signal transmission density according to a speed level to which the current driving speed belongs; and a first sending module, configured to send a reference signal to a connected vehicle terminal at an opposite end according to the reference signal transmission density.

In an embodiment, the first sending module may include: a sending sub-module, configured to send the reference signal to the connected vehicle terminal at the opposite end through a control channel in a unicast mode.

In an embodiment, the device may further include: a second sending module, configured to send level identification information of the speed level to the connected vehicle terminal at the opposite end.

In an embodiment, the device may further include: a first receiving module, configured to receive relevant driving information of the opposite end sent by a vehicle terminal at the opposite end.

The density determining module may include: a level determining sub-module, configured to determine the speed level according to the current driving speed and the relevant driving information of the opposite end; and a density determining sub-module, configured to determine the corresponding reference signal transmission density according to the determined speed level.

In an embodiment, the relevant driving information of the opposite end may include at least one of: a driving speed of the opposite end, a driving direction of the opposite end, or a relative driving speed.

In an embodiment, the device may further include: a second receiving module, configured to receive feedback information sent by a vehicle terminal at the opposite end; and an adjusting module, configured to increase the speed level to which the current driving speed belongs in response to the feedback information meeting a preset increase condition.

In an embodiment, the feedback information may include at least one of: link measurement information or a feedback signal for the reference signal.

The increase condition may include at least one of: the feedback signal indicating reception failure; the feedback signal indicating reception failure, and a number of consecutive failures reaching a preset failure number threshold; or link quality indicated by the link measurement information being lower than a preset quality threshold.

According to a third aspect of embodiments of the present disclosure, there is provided a device for transmitting a reference signal, which includes: a processor; and a memory configured to store instructions executable by the processor.

The processor is configured to: acquire a current driving speed; determine a corresponding reference signal transmission density according to a speed level to which the current driving speed belongs; and send a reference signal to a connected vehicle terminal at an opposite end according to the reference signal transmission density.

According to a fourth aspect of embodiments of the present disclosure, there is provided a computer-readable storage medium having stored therein computer instructions that, when executed by a processor, implements the above method for transmitting the reference signal.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In a related art, a vehicle terminal (or called a vehicle-mounted terminal) in an Internet of Vehicles may move at a high speed, thereby resulting in poor communication quality. After a reference signal is sent, reception of a vehicle terminal at an opposite end is likely to fail, which is not conducive to communication transmission.

In order to solve the problem, a transmission density of a reference signal may be adjusted according to a driving speed of a vehicle terminal in embodiments, so as to improve possibility of a vehicle terminal at an opposite end successfully receiving the reference signal, facilitating subsequent communication and transmission.

Figure 1:
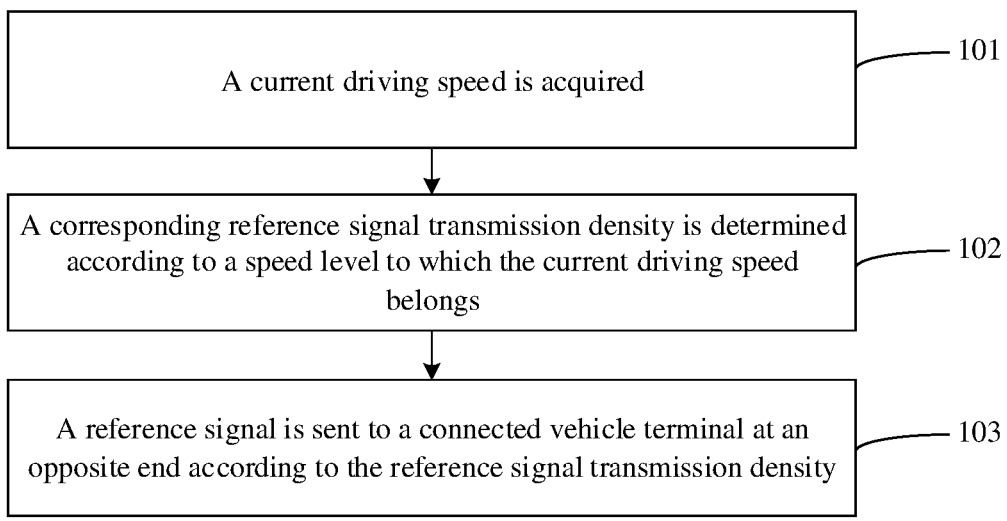
FIG. 1 is a flow chart showing a method for transmitting a reference signal, according to an exemplary embodiment.

FIG. 1 is a flow chart showing a method for transmitting a reference signal, according to an exemplary embodiment. The method for transmitting the reference signal is applied to a vehicle terminal. As illustrated in FIG. 1, the method includes the following steps 101 to 103.

In step 101, a current driving speed (or called current traveling speed) is acquired.

In step 102, a corresponding reference signal transmission density is determined according to a speed level to which the current driving speed belongs.

In step 103, a reference signal is sent to a connected vehicle terminal at an opposite end according to the reference signal transmission density.

In the embodiment, the vehicle terminal may periodically acquire the current driving speed. The time period may be 1 to 5 minutes, etc., and may be configured flexibly as needed. Within the period, the reference signal is transmitted according to the reference signal transmission density currently determined. Or, according to a communication need, if there is no need to send a reference signal for a period of time, such as when the vehicle terminal is in an idle state, there is no need to acquire the current driving speed. When a reference signal is to be sent, such as when the vehicle terminal is in an active connected state, the current driving speed is acquired.

In the embodiment, a corresponding relationship between the driving speed and the speed level and a corresponding relationship between the speed level and the reference signal transmission density are configured for a vehicle terminal in advance. The higher the driving speed, the greater the corresponding speed level, and the greater the corresponding reference signal transmission density. In an embodiment, the highest speed level corresponds to the maximal reference signal transmission density. The maximal driving speed corresponds to the highest speed level. When being initially connected to the Internet of Vehicles, a low driving speed may correspond to a low speed level or a high speed level. An Internet of Vehicles system may be pre-configured, and adjusted subsequently according to a factor such as a driving speed and a network communication environment, and the like. In an embodiment, the higher the driving speed, the greater the corresponding reference signal transmission density, thereby increasing possibility of a vehicle terminal at an opposite end successfully receiving a reference signal. The lower the driving speed, the smaller the corresponding reference signal transmission density, thereby saving a network resource occupied by a reference signal, and ensuring increased possibility of a vehicle terminal at an opposite end successfully receiving the reference signal.

The reference signal transmission density refers to a number or count of reference signals transmitted within a unit time. The unit time may be 1 ms or 1 time slot or 1 sub-frame, or the like. It may be configured flexibly as needed.

After receiving the reference signal, the vehicle terminal at the opposite end may perform channel estimation, channel quality measurement and the like based on the reference signal.

In the embodiment, the reference signal transmission density is adjusted flexibly according to the driving speed, which is more in line with a communication requirement.

In an embodiment, the step 103 includes step A.

In the step A, the reference signal may be sent to the connected vehicle terminal at the opposite end through a control channel in a unicast mode.

The embodiment provides a mode of transmitting the reference signal, that is, the reference signal is sent through the control channel in the unicast mode.

In an embodiment, the method further includes step B.

In the step B, level identification information of the speed level may be sent to the connected vehicle terminal at the opposite end.

In the embodiment, the level identification information of the speed level may be sent to the vehicle terminal at the opposite end, so that the vehicle terminal at the opposite end may learn the speed level, then determine the reference signal transmission density, and may receive the reference signal better according to the reference signal transmission density.

The step B may be performed before the step 103, that is, the vehicle terminal at the opposite end may learn the reference signal transmission density before receiving the reference signal, so as to better receive the reference signal. Alternatively, the step B is performed synchronously with the step 103, the reference signal and the level identification information may be transmitted in the same information block, which saves the transmission number, such that the vehicle terminal at the opposite end may better receive the reference signal.

In an embodiment, the method further includes step C1.

In the step C1, relevant driving information of the opposite end sent by a vehicle terminal at the opposite end may be received.

The step 102 includes steps C2 to C3.

In the step C2, the speed level may be determined according to the current driving speed and the relevant driving information of the opposite end.

In the step C3, the corresponding reference signal transmission density may be determined according to the determined speed level.

In the embodiment, the vehicle terminal at the opposite end may send the relevant driving information of the opposite end in advance. The vehicle terminal may determine the speed level more accurately according to the current driving speed of the vehicle terminal combined with the relevant driving information of the opposite end, and then determine the more appropriate reference signal transmission density.

In an embodiment, the relevant driving information of the opposite end includes at least one of: a driving speed of the opposite end, a driving direction of the opposite end, or a relative driving speed.

In the embodiment, there may be multiple types of relevant driving information of the opposite end related to the driving speed. Knowing the driving speed of the opposite end and the driving direction of the opposite end, the relative driving speed relative to the vehicle terminal at the opposite end may be determined. The speed level may be determined accurately according to the relative driving speed.

To receive the relative driving speed sent by the vehicle terminal at the opposite end, driving direction information and the current driving speed have to be sent to the connected vehicle terminal at the opposite end in advance. The relative driving speed is calculated and fed back by the vehicle terminal at the opposite end.

In an embodiment, the method further includes step D1 to step D2.

In the step D1, feedback information sent by a vehicle terminal at the opposite end is received.

In the step D2, when the feedback information meets a preset increase condition, the speed level to which the current driving speed belongs is increased.

In the embodiment, the vehicle terminal at the opposite end may further send feedback information, and the feedback information is related to reception quality. The vehicle terminal may adjust the speed level to which the current driving speed belongs according to the receiving quality of the vehicle terminal at the opposite end. For example, a corresponding speed level 1 is determined according to the current driving speed (such as 60 kilometers/hour). When the feedback information meets the preset increase condition, a speed level 2 corresponding to the current driving speed (such as 60 km/h) is determined.

In an embodiment, the feedback information includes at least one of: link measurement information or a feedback signal for the reference signal.

The increase condition includes at least one of: the feedback signal indicating reception failure; the feedback signal indicating reception failure, and a number of consecutive failures reaching a preset failure number threshold; or link quality indicated by the link measurement information being lower than a preset quality threshold.

In the embodiment, the feedback signal indicates the success or recognition of receiving the reference signal, namely ACK (acknowledgement) or NACK (non-acknowledgement). If the feedback signal is NACK, it means that the reception quality is not good. If there are multiple NACKs in a row, it means that the reception quality is fairly poor.

The link measurement information may directly reflect channel quality, which is equivalent to the reception quality. The link quality indicated by the link measurement information being lower than the preset quality threshold indicates that the reception quality is poor.

When the reception quality is poor, increasing the speed level, that is, increasing the reference signal transmission density, helps to increase the possibility of successfully receiving the reference signal by the vehicle terminal at the opposite end.

If the reception quality is good, the corresponding speed level may be lowered, just by configuring a lowering condition in advance, such as, the feedback signal indicating reception success, and a number of consecutive successful receptions reaching a preset success number threshold; or link quality indicated by the link measurement information being higher than a preset quality threshold.

In the embodiments, various communications between vehicle terminals may be completed through the control channel in the unicast mode.

The implementation process is elaborated below through embodiments.

Figure 2:
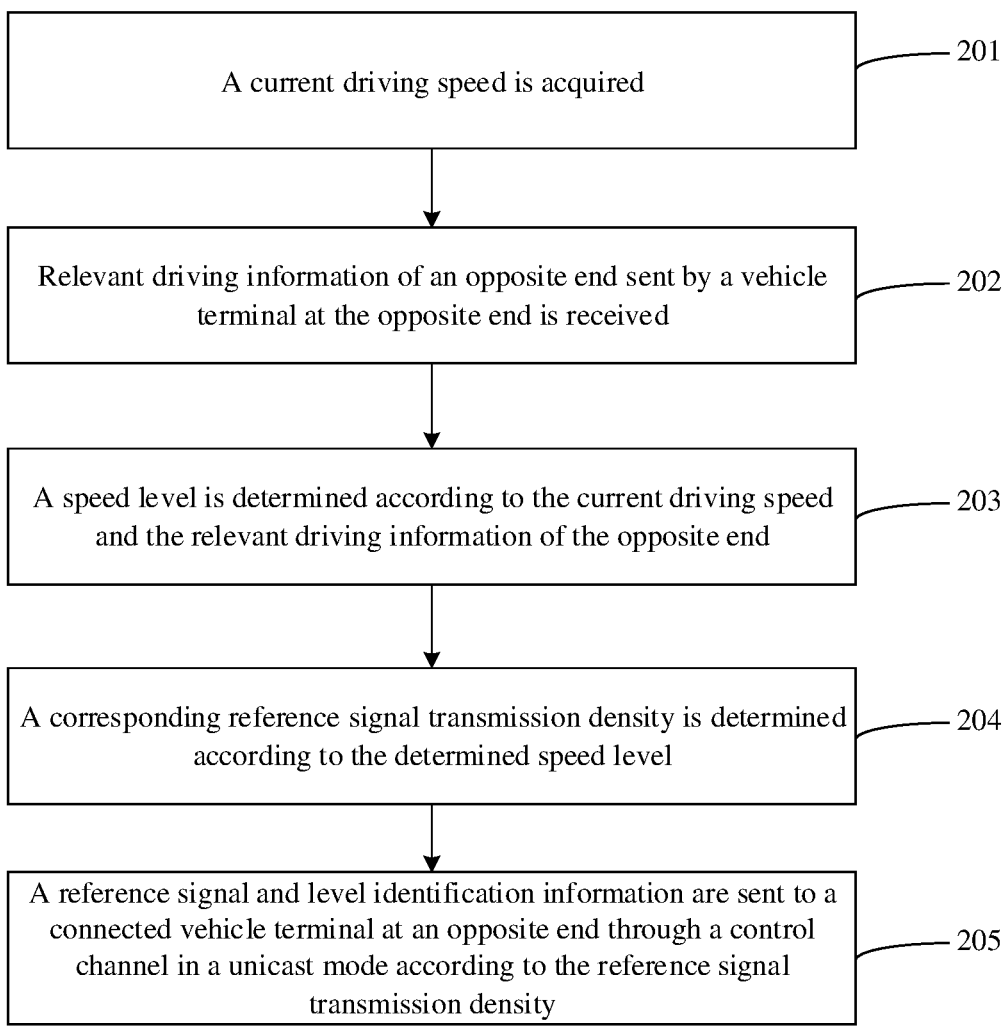
FIG. 2 is a flow chart showing a method for transmitting a reference signal, according to an exemplary embodiment.

FIG. 2 is a flow chart showing a method for transmitting a reference signal, according to an exemplary embodiment. The method for transmitting the reference signal is applied to a vehicle terminal. As illustrated in FIG. 2, the method includes the following steps 201 to 205.

In step 201, a current driving speed is acquired.

In step 202, relevant driving information of an opposite end sent by a vehicle terminal at the opposite end is received.

The execution order of step 201 and step 202 can be interchanged.

In step 203, a speed level is determined according to the current driving speed and the relevant driving information of the opposite end.

In step 204, a corresponding reference signal transmission density is determined according to the determined speed level.

In step 205, a reference signal and level identification information are sent to a connected vehicle terminal at the opposite end through a control channel in a unicast mode according to the reference signal transmission density.

Figure 3:
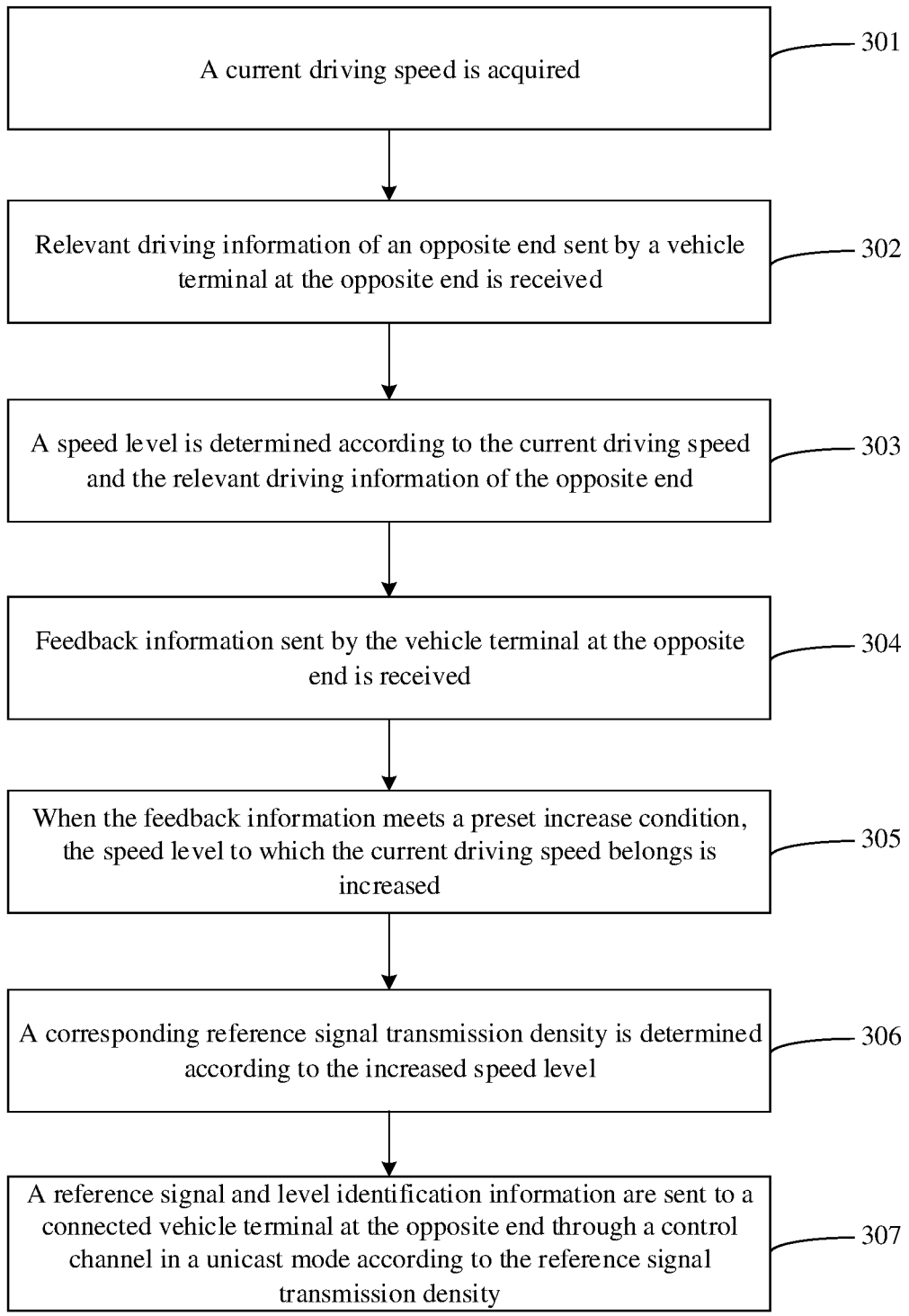
FIG. 3 is a flow chart showing a method for transmitting a reference signal, according to an exemplary embodiment.

FIG. 3 is a flow chart showing a method for transmitting a reference signal, according to an exemplary embodiment. The method for transmitting the reference signal is applied to a vehicle terminal. As illustrated in FIG. 3, the method includes the following steps 301 to 307.

In step 301, a current driving speed is acquired.

In step 302, relevant driving information of an opposite end sent by a vehicle terminal at the opposite end is received.

In step 303, a speed level is determined according to the current driving speed and the relevant driving information of the opposite end.

In step 304, feedback information sent by the vehicle terminal at the opposite end is received.

The step 304 may be performed before step 305.

In the step 305, when the feedback information meets a preset increase condition, the speed level to which the current driving speed belongs is increased.

In step 306, a corresponding reference signal transmission density is determined according to the increased speed level.

In step 307, a reference signal and level identification information are sent to a connected vehicle terminal at the opposite end through a control channel in a unicast mode according to the reference signal transmission density.

The embodiments may be combined flexibly as needed.

The following are device embodiments of the present disclosure, which may be configured to implement the method embodiments of the present disclosure.

Figure 4:
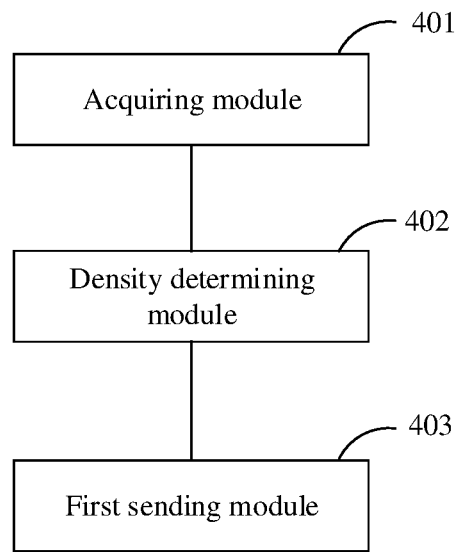
FIG. 4 is a flow chart showing a method for transmitting a reference signal, according to an exemplary embodiment.

FIG. 4 is a block diagram of a device for transmitting a reference signal, according to an exemplary embodiment. The device may be implemented as a part of electronic equipment or the entire electronic equipment through software, hardware or a combination of both. Referring to FIG. 4, the device for transmitting the reference signal includes an acquiring module 401, a density determining module 402, and a first sending module 403.

The acquiring module 401 is configured to acquire a current driving speed.

The density determining module 402 is configured to determine a corresponding reference signal transmission density according to a speed level to which the current driving speed belongs.

The first sending module 403 is configured to send a reference signal to a connected vehicle terminal at an opposite end according to the reference signal transmission density.

Figure 5:
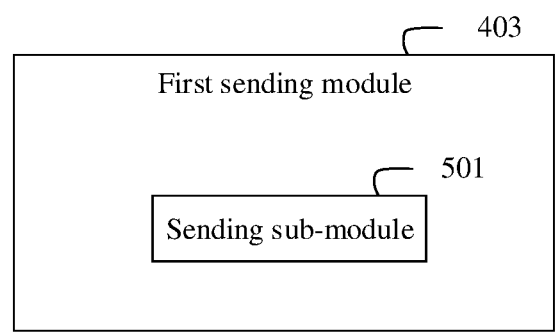
FIG. 5 is a block diagram of a first sending module, according to an exemplary embodiment.

In an embodiment, as illustrated in FIG. 5, the first sending module 403 includes a sending sub-module 501.

The sending sub-module 501 is configured to send the reference signal to the connected vehicle terminal at the opposite end through a control channel in a unicast mode.

Figure 6:
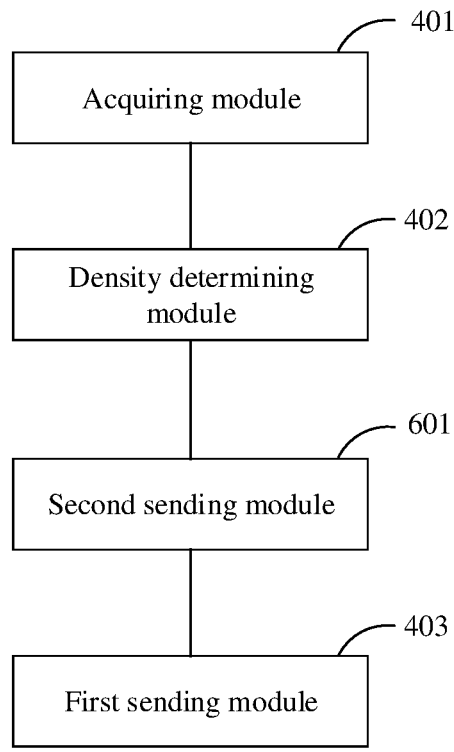
FIG. 6 is a block diagram of a device for transmitting a reference signal, according to an exemplary embodiment.

In an embodiment, as illustrated in FIG. 6, the device further includes a second sending module 601.

The second sending module 601 is configured to send level identification information of the speed level to the connected vehicle terminal at the opposite end.

Figure 7:
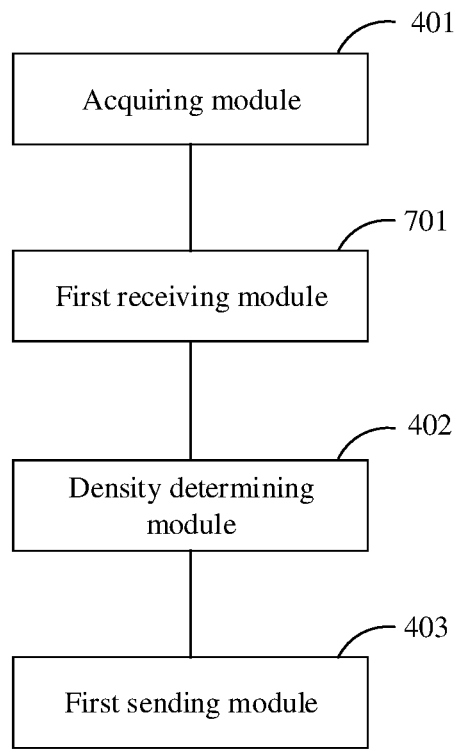
FIG. 7 is a block diagram of a device for transmitting a reference signal, according to an exemplary embodiment.

In an embodiment, as illustrated in FIG. 7, the device further includes a first receiving module 701.

The first receiving module 701 is configured to receive relevant driving information of the opposite end sent by a vehicle terminal at the opposite end.

Figure 8:
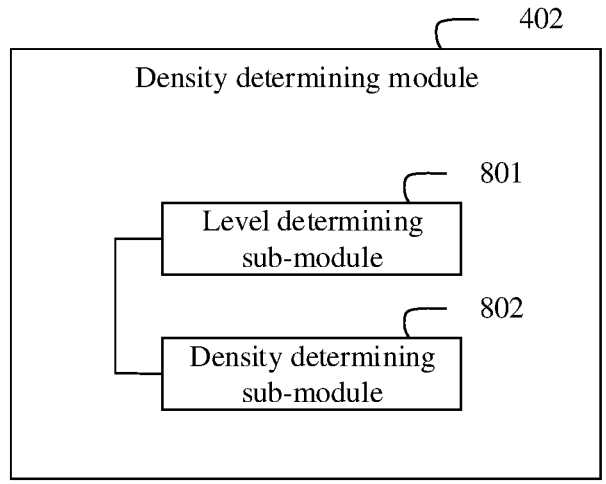
FIG. 8 is a block diagram of a density determining module, according to an exemplary embodiment.

As illustrated in FIG. 8, the density determining module 402 includes a level determining sub-module 801 and a density determining sub-module 802.

The level determining sub-module 801 is configured to determine the speed level according to the current driving speed and the relevant driving information of the opposite end.

The density determining sub-module 802 is configured to determine the corresponding reference signal transmission density according to the determined speed level.

In an embodiment, the relevant driving information of the opposite end includes at least one of: a driving speed of the opposite end, a driving direction of the opposite end, or a relative driving speed.

Figure 9:
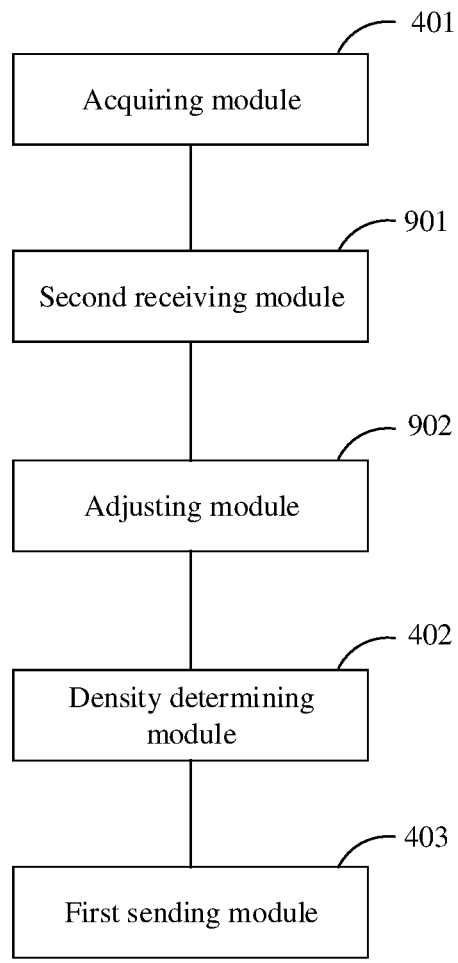
FIG. 9 is a block diagram of a device for transmitting a reference signal, according to an exemplary embodiment.

In an embodiment, as illustrated in FIG. 9, the device further includes a second receiving module 901 and an adjusting module 902.

The second receiving module 901 is configured to receive feedback information sent by a vehicle terminal at the opposite end.

The adjusting module 902 is configured to, in response to the feedback information meeting a preset increase condition, increase the speed level to which the current driving speed belongs.

In an embodiment, the feedback information includes at least one of: link measurement information or a feedback signal for the reference signal.

The increase condition includes at least one of: the feedback signal indicating reception failure; the feedback signal indicating reception failure, and a number of consecutive failures reaching a preset failure number threshold; or link quality indicated by the link measurement information being lower than a preset quality threshold.

In an embodiment, the highest speed level corresponds to the maximal reference signal transmission density.

Each module in the device according to the above embodiments herein may perform an operation in a mode elaborated in the above embodiments of the method herein, which will not be repeated here.

Figure 10:
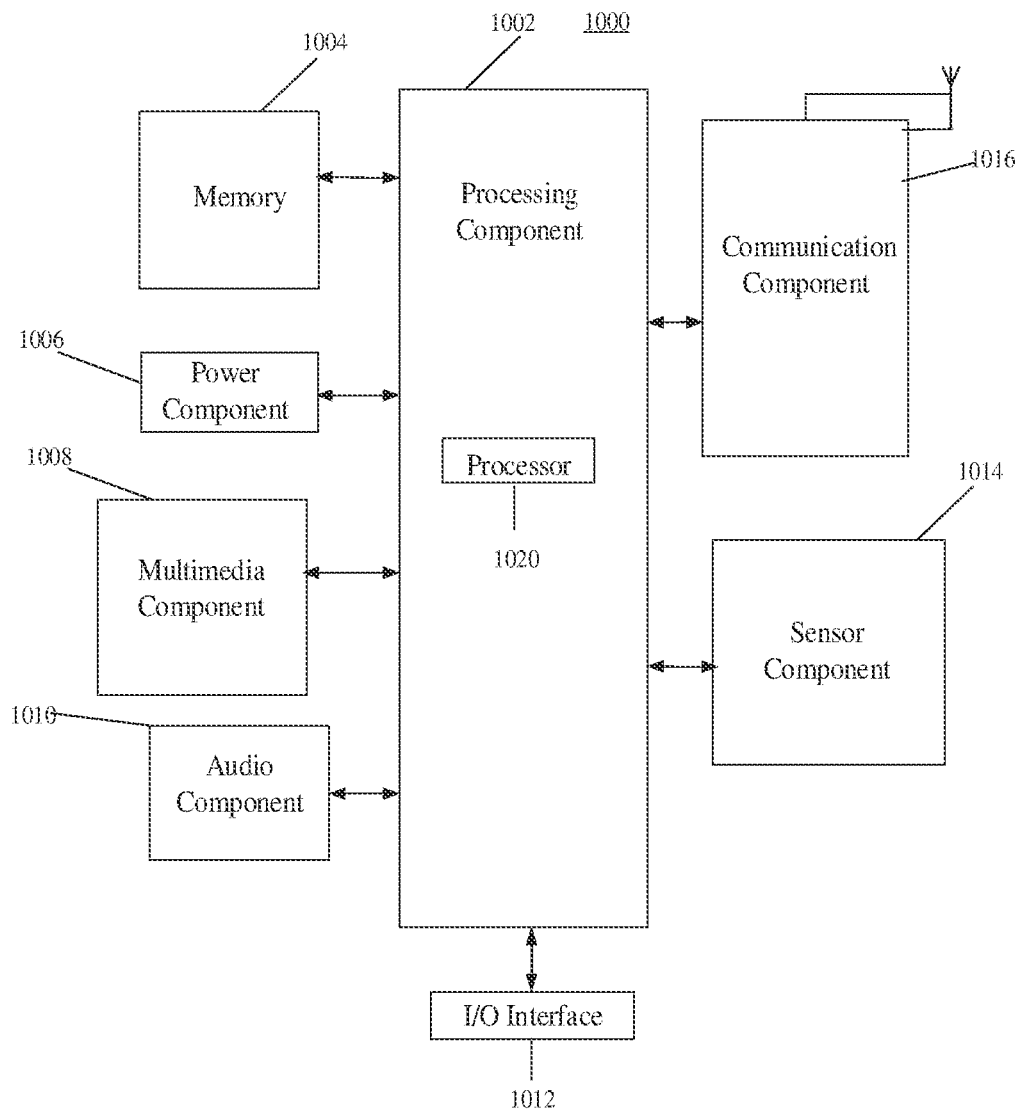
FIG. 10 is a block diagram of a device for transmitting a reference signal, according to an exemplary embodiment.

FIG. 10 is a block diagram of a device for transmitting a reference signal, according to an exemplary embodiment. For example, the device 1000 may be a mobile phone, a computer, a digital broadcast terminal, a messaging device, a gaming console, a tablet, a medical device, exercise equipment, a personal digital assistant (PDA), and the like.

The device 1000 may include one or more of the following components: a processing component 1002, a memory 1004, a power component 1006, a multimedia component 1008, an audio component 1010, an input/output (I/O) interface 1012, a sensor component 1014, or a communication component 1016.

The processing component 1002 typically controls overall operations of the device 1000, such as the operations associated with display, telephone calls, data communications, camera operations, and recording operations. The processing component 1002 may include one or more processors 1020 to execute instructions to complete all or part of the steps in the above method. In addition, the processing component 1002 may include one or more modules which facilitate interaction between the processing component 1002 and other components. For example, the processing component 1002 may include a multimedia module to facilitate interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented by any type of volatile or non-volatile memory device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1006 provides power for various components of the device 1000. The power component 1006 may include a power management system, one or more power supplies, and other components associated with generation, management and distribution of power for the device 1000.

The multimedia component 1008 includes a screen providing an output interface between the device 1000 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1008 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a microphone (MIC), and the MIC is configured to receive an external audio signal when the device 1000 is in an operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 provides an interface between the processing component 1002 and peripheral interface modules, such as a keyboard, a click wheel, buttons, and the like. The buttons may include, but are not limited to: a home button, a volume button, a starting button and a locking button.

The sensor component 1014 includes one or more sensors configured to provide status assessments in various aspects for the device 1000. For example, the sensor component 1014 may detect an on/off status of the device 1000 and relative positioning of components, such as a display and small keyboard of the device 1000, and the sensor component 1014 may further detect a change in a position of the device 1000 or a component of the device 1000, presence or absence of contact between the user and the device 1000, orientation or acceleration/deceleration of the device 1000, and a change in temperature of the device 1000. The sensor component 1014 may include a proximity sensor configured to detect presence of an object nearby without any physical contact. The sensor component 1014 may also include a light sensor, such as a complementary metal oxide semiconductor (CMOS) or charge coupled device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and other devices. The device 1000 may access a communication-standard-based wireless network, such as a wireless fidelity (WiFi) network, a 2nd-generation (2G), or 3rd-generation (3G), or a combination thereof. In an exemplary embodiment, the communication component 1016 receives a broadcast signal or broadcast associated information from an external broadcast management system through a broadcast channel. In an exemplary embodiment, the communication component 1016 further includes a near field communication (NFC) module to facilitate short-range communications. For example, the NFC module may be implemented based on a radio frequency identification (RFID) technology, an infrared data association (IrDA), ultra-wide band (UWB) technology, a Bluetooth (BT) technology, and other technologies.

In an exemplary embodiment, the device 1000 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to implement the method.

In an exemplary embodiment, there is also provided a non-transitory computer-readable storage medium including instructions, such as included in the memory 1004, executable by the processor 1020 of the device 1000 to complete the above method. For example, the non-transitory computer-readable storage medium may be a ROM, a random access memory (RAM), a compact disc read-only memory (CD-ROM), a magnetic tape, a floppy disc, an optical data storage device, and the like.

In an exemplary embodiment, a device for transmitting a reference signal includes: a processor and a memory configured to store instructions executable by the processor.

The processor is configured to: acquire a current driving speed; determine a corresponding reference signal transmission density according to a speed level to which the current driving speed belongs; and send a reference signal to a connected vehicle terminal at an opposite end according to the reference signal transmission density.

The processor may further be configured as follows.

The operation of sending the reference signal to the connected vehicle terminal at the opposite end may include: the reference signal is sent to the connected vehicle terminal at the opposite end through a control channel in a unicast mode.

The processor may further be configured as follows.

The method may further include: level identification information of the speed level is sent to the connected vehicle terminal at the opposite end.

The processor may further be configured as follows.

The method may further include: relevant driving information of the opposite end sent by a vehicle terminal at the opposite end is received.

The operation of determining the corresponding reference signal transmission density according to the speed level to which the current driving speed belongs may include: the speed level is determined according to the current driving speed and the relevant driving information of the opposite end; and the corresponding reference signal transmission density is determined according to the determined speed level.

The processor may further be configured as follows.

The relevant driving information of the opposite end may include at least one of: a driving speed of the opposite end, a driving direction of the opposite end, or a relative driving speed.

The processor may further be configured as follows.

The method may further include: feedback information sent by a vehicle terminal at the opposite end is received; and in response to the feedback information meeting a preset increase condition, the speed level to which the current driving speed belongs is increased.

The processor may further be configured as follows.

The feedback information may include at least one of: link measurement information or a feedback signal for the reference signal; and the increase condition may include at least one of: the feedback signal indicating reception failure; the feedback signal indicating reception failure, and a number of consecutive failures reaching a preset failure number threshold; or link quality indicated by the link measurement information being lower than a preset quality threshold.

A computer-readable storage medium has stored therein computer instructions that, when executed by a processor of a device, causes the device to implement the above method for transmitting the reference signal. The method includes: acquiring a current driving speed; determining a corresponding reference signal transmission density according to a speed level to which the current driving speed belongs; and sending a reference signal to a connected vehicle terminal at an opposite end according to the reference signal transmission density.

The instructions in the storage medium may further include as follows.

The operation of sending the reference signal to the connected vehicle terminal at the opposite end may include: the reference signal is sent to the connected vehicle terminal at the opposite end through a control channel in a unicast mode.

The instructions in the storage medium may further include as follows.

The method may further include: level identification information of the speed level is sent to the connected vehicle terminal at the opposite end.

The instructions in the storage medium may further include as follows.

The method may further include: relevant driving information of the opposite end sent by a vehicle terminal at the opposite end is received.

The operation of determining the corresponding reference signal transmission density according to the speed level to which the current driving speed belongs may include: the speed level is determined according to the current driving speed and the relevant driving information of the opposite end; and the corresponding reference signal transmission density is determined according to the determined speed level.

The instructions in the storage medium may further include as follows.

The relevant driving information of the opposite end may include at least one of: a driving speed of the opposite end, a driving direction of the opposite end, or a relative driving speed.

The instructions in the storage medium may further include as follows.

The method may further include: feedback information sent by a vehicle terminal at the opposite end is received; and in response to the feedback information meeting a preset increase condition, the speed level to which the current driving speed belongs is increased.

The instructions in the storage medium may further include as follows.

The feedback information may include at least one of: link measurement information or a feedback signal for the reference signal; and the increase condition may include at least one of: the feedback signal indicating reception failure; the feedback signal indicating reception failure, and a number of consecutive failures reaching a preset failure number threshold; or link quality indicated by the link measurement information being lower than a preset quality threshold.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting a reference signal, applied to a vehicle terminal, comprising:
acquiring a current driving speed;
determining a corresponding reference signal transmission density according to a speed level to which the current driving speed belongs;
sending a reference signal to a connected vehicle terminal at an opposite end according to the corresponding reference signal transmission density, and sending level identification information of the speed level to the connected vehicle terminal at the opposite end; wherein the reference signal and the level identification information are transmitted in a same information block;
receiving feedback information sent by the connected vehicle terminal at the opposite end; and
in response to the feedback information meeting a preset increase condition, increasing the speed level to which the current driving speed belongs;
wherein the feedback information comprises a feedback signal for the reference signal, and the preset increase condition comprises: the feedback signal indicating reception failure, and a number of consecutive failures reaching a preset failure number threshold.

2. The method of claim 1, wherein sending the reference signal to the connected vehicle terminal at the opposite end comprises:
sending the reference signal to the connected vehicle terminal at the opposite end through a control channel in a unicast mode.

3. The method of claim 1, further comprising:
receiving relevant driving information of the opposite end sent by the connected vehicle terminal at the opposite end;
wherein determining the corresponding reference signal transmission density according to the speed level to which the current driving speed belongs comprises:
determining the speed level according to the current driving speed and the relevant driving information of the opposite end; and
determining the corresponding reference signal transmission density according to the determined speed level.

4. The method of claim 3, wherein the relevant driving information of the opposite end comprises at least one of: a driving speed of the opposite end, a driving direction of the opposite end, or a relative driving speed.

5. The method of claim 1, wherein the feedback information further comprises link measurement information;
wherein the preset increase condition further comprises link quality indicated by the link measurement information being lower than a preset quality threshold.

6. A device for transmitting a reference signal, comprising:
a processor; and
a memory configured to store instructions executable by the processor;
wherein the processor is configured to:
acquire a current driving speed;
determine a corresponding reference signal transmission density according to a speed level to which the current driving speed belongs;
send a reference signal to a connected vehicle terminal at an opposite end according to the corresponding reference signal transmission density, and send level identification information of the speed level to the connected vehicle terminal at the opposite end; wherein the reference signal and the level identification information are transmitted in a same information block;
receive feedback information sent by the connected vehicle terminal at the opposite end; and
increase the speed level to which the current driving speed belongs in response to the feedback information meeting a preset increase condition;
wherein the feedback information comprises a feedback signal for the reference signal, and the preset increase condition comprises: the feedback signal indicating reception failure, and a number of consecutive failures reaching a preset failure number threshold.

7. The device of claim 6, wherein the processor is further configured to:
send the reference signal to the connected vehicle terminal at the opposite end through a control channel in a unicast mode.

8. The device of claim 6, wherein the processor is further configured to:
receive relevant driving information of the opposite end sent by the connected vehicle terminal at the opposite end;
determine the speed level according to the current driving speed and the relevant driving information of the opposite end; and
determine the corresponding reference signal transmission density according to the determined speed level.

9. The device of claim 8, wherein the relevant driving information of the opposite end comprises at least one of: a driving speed of the opposite end, a driving direction of the opposite end, or a relative driving speed.

10. The device of claim 6, wherein the feedback information further comprises link measurement information;
wherein the preset increase condition further comprises link quality indicated by the link measurement information being lower than a preset quality threshold.

11. A non-transitory computer-readable storage medium having stored therein computer instructions that, when executed by a processor, implements a method for transmitting a reference signal, applied to a vehicle terminal, comprising:
acquiring a current driving speed;
determining a corresponding reference signal transmission density according to a speed level to which the current driving speed belongs;
sending a reference signal to a connected vehicle terminal at an opposite end according to the corresponding reference signal transmission density, and sending level identification information of the speed level to the connected vehicle terminal at the opposite end; wherein the reference signal and the level identification information are transmitted in a same information block;
receiving feedback information sent by the connected vehicle terminal at the opposite end; and
in response to the feedback information meeting a preset increase condition, increasing the speed level to which the current driving speed belongs;
wherein the feedback information comprises a feedback signal for the reference signal, and the preset increase condition comprises: the feedback signal indicating reception failure, and a number of consecutive failures reaching a preset failure number threshold.

12. The non-transitory computer-readable storage medium of claim 11, wherein sending the reference signal to the connected vehicle terminal at the opposite end comprises:
   sending the reference signal to the connected vehicle terminal at the opposite end through a control channel in a unicast mode.

13. The non-transitory computer-readable storage medium of claim 11, further comprising:
   receiving relevant driving information of the opposite end sent by the connected vehicle terminal at the opposite end;
   wherein determining the corresponding reference signal transmission density according to the speed level to which the current driving speed belongs comprises:
      determining the speed level according to the current driving speed and the relevant driving information of the opposite end; and
      determining the corresponding reference signal transmission density according to the determined speed level.

14. The non-transitory computer-readable storage medium of claim 13, wherein the relevant driving information of the opposite end comprises at least one of: a driving speed of the opposite end, a driving direction of the opposite end, or a relative driving speed.

* * * * *